(12) United States Patent  
Miyagi et al.

(10) Patent No.: US 8,305,392 B2  
(45) Date of Patent: Nov. 6, 2012

(54) STORAGE MEDIUM HAVING GAME PROGRAM STORED THEREIN AND GAME APPARATUS

(75) Inventors: Atsushi Miyagi, Kyoto (JP); Haruyasu Ito, Kyoto (JP); Makoto Sasaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1120 days.

(21) Appl. No.: 11/507,512

(22) Filed: Aug. 22, 2006

(65) Prior Publication Data

US 2007/0132777 A1 Jun. 14, 2007

(30) Foreign Application Priority Data

Dec. 12, 2005 (JP) ................... 2005-358139

(51) Int. Cl.  
*G09G 5/02* (2006.01)

(52) U.S. Cl. ...................................................... 345/592

(58) Field of Classification Search .................. 345/592  
See application file for complete search history.

(56) References Cited

U.S. PATENT DOCUMENTS

| | | | | |
|---|---|---|---|---|
| 5,363,475 | A * | 11/1994 | Baker et al. | 345/422 |
| 5,630,718 | A * | 5/1997 | Montag et al. | 434/2 |
| 6,147,690 | A * | 11/2000 | Cosman | 345/592 |
| 6,184,891 | B1 * | 2/2001 | Blinn | 345/426 |
| 6,268,861 | B1 | 7/2001 | Sanz-Pastor et al. | |
| 6,417,862 | B1 | 7/2002 | Brothers et al. | |
| 6,437,781 | B1 * | 8/2002 | Tucker et al. | 345/426 |
| 6,580,430 | B1 * | 6/2003 | Hollis et al. | 345/473 |
| 6,744,430 | B1 * | 6/2004 | Shimizu | 345/420 |
| 6,784,895 | B1 * | 8/2004 | Munshi | 345/582 |
| 6,940,504 | B1 | 9/2005 | Mech et al. | |
| 7,046,243 | B1 * | 5/2006 | Mech | 345/426 |
| 2001/0040575 | A1 * | 11/2001 | Haga et al. | 345/473 |
| 2003/0193496 | A1 * | 10/2003 | Wada | 345/419 |

FOREIGN PATENT DOCUMENTS

WO 97/34241 9/1997

OTHER PUBLICATIONS

Famitsu Weekly, Enterbrain Inc. a Sep. 9$^{th}$ edition, 2005, pp. 274 to 275.  
Möller et al., "Real-Time Rendering", Sep. 1999, AK Peters, Ltd., pp. 89-93.

* cited by examiner

*Primary Examiner* — Edward Martello  
(74) *Attorney, Agent, or Firm* — Nixon & Vanderhye P.C.

(57) ABSTRACT

A color image viewed from a virtual camera is generated. Next, a fog image is generated by adding a fog color to respective objects in accordance with distances from a position, which is represented by a Z value, of a player object to positions of the respective objects which are represented by Z values. Further, mask processing is performed so as to add to the fog image a predetermined fog color in accordance with distances from a predetermined reference pixel to pixels in a lateral and a longitudinal directions in the fog image. And an image into which the fog image and the color image have been synthesized is displayed as a game image.

26 Claims, 15 Drawing Sheets

F I G. 8 A
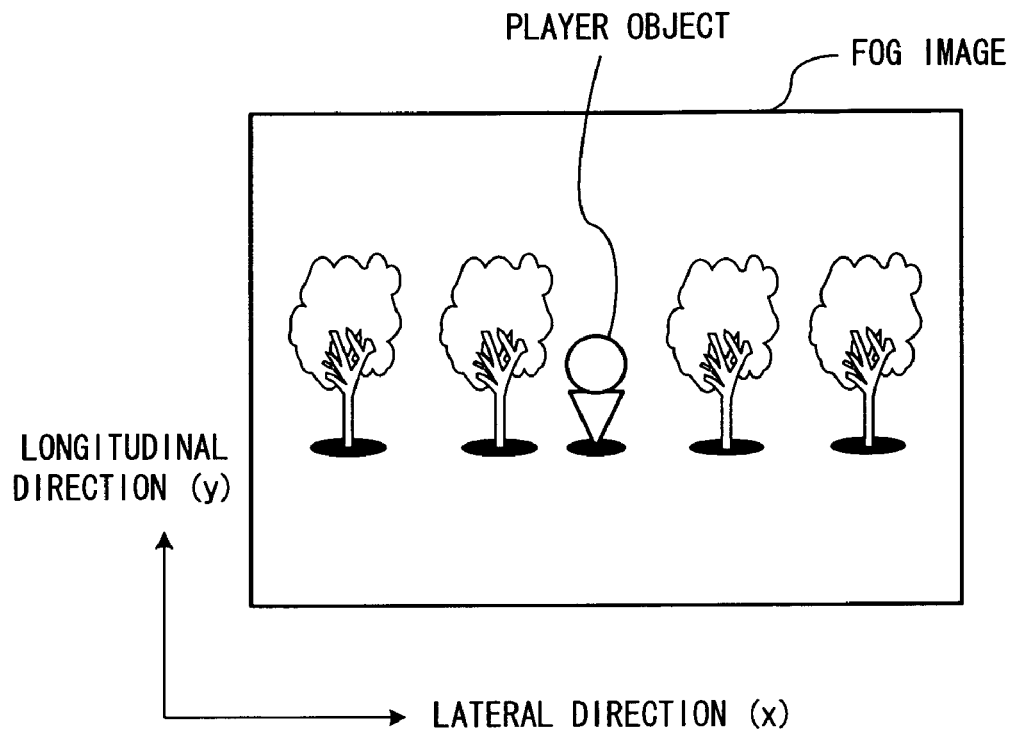
F I G. 8 B
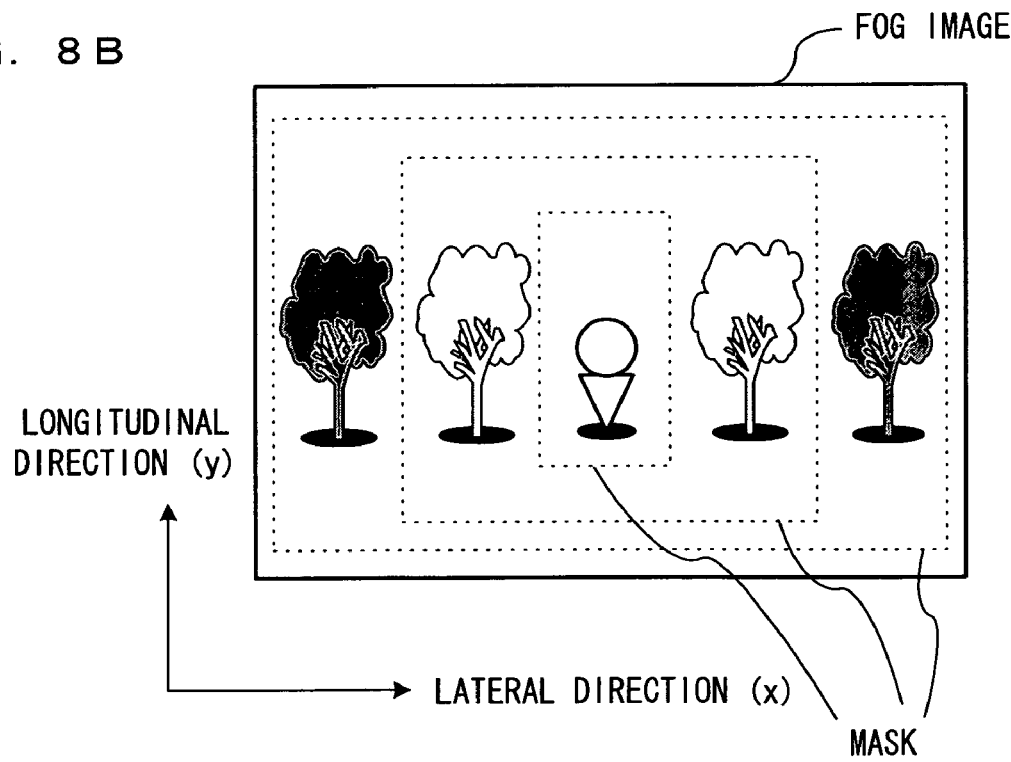

| DISTANCE (PIXEL) FROM MASK REFERENCE POINT | ALPHA ADJUSTING VALUE (%) | FOG COLOR ADJUSTING VALUE (%) |
|---|---|---|
| EQUAL TO OR GREATER THAN +101 | +100 | +100 |
| +71 TO +100 | +90 | +70 |
| +41 TO +70 | +70 | +40 |
| +21 TO +40 | +50 | +20 |
| +11 TO +20 | +30 | +10 |
| +1 TO +10 | +10 | +5 |
| 0 | 0 | 0 |
| −1 TO −10 | +10 | +5 |
| −11 TO −20 | +30 | +10 |
| −21 TO −40 | +50 | +20 |
| −41 TO −70 | +70 | +40 |
| −71 TO −100 | +90 | +70 |
| EQUAL TO OR LESS THAN −101 | +100 | +100 |

F I G. 1 0

3461

| DISTANCE (PIXEL) FROM MASK REFERENCE POINT | ALPHA ADJUSTING VALUE (%) | FOG COLOR ADJUSTING VALUE (%) |
|---|---|---|
| EQUAL TO OR GREATER THAN +91 | +100 | +100 |
| +81 TO +90 | +80 | +70 |
| +71 TO +80 | +50 | +40 |
| +61 TO +70 | +30 | +20 |
| +51 TO +60 | +10 | +10 |
| +1 TO +50 | 0 | 0 |
| 0 | 0 | 0 |
| -1 TO -10 | 0 | 0 |
| -11 TO -20 | +10 | +10 |
| -21 TO -30 | +50 | +20 |
| EQUAL TO OR LESS THAN -31 | +70 | +40 |

F I G. 1 1

3452

| DISTANCE (PIXEL) FROM MASK REFERENCE POINT | ALPHA ADJUSTING VALUE (%) | FOG COLOR ADJUSTING VALUE (%) |
|---|---|---|
| EQUAL TO OR GREATER THAN +51 | +100 | +100 |
| +31 TO +50 | +70 | +70 |
| +11 TO +30 | +40 | +40 |
| +1 TO +10 | +10 | +10 |
| 0 | 0 | 0 |
| -1 TO -10 | +10 | +10 |
| -11 TO -30 | +40 | +40 |
| -31 TO -50 | +70 | +70 |
| EQUAL TO OR LESS THAN -51 | +100 | +100 |

F I G. 1 2

3462

| DISTANCE (PIXEL) FROM MASK REFERENCE POINT /91 | ALPHA ADJUSTING VALUE (%) /92 | FOG COLOR ADJUSTING VALUE (%) /93 |
|---|---|---|
| EQUAL TO OR GREATER THAN +71 | +100 | +100 |
| +41 TO +70 | +50 | +40 |
| +21 TO +40 | +10 | +20 |
| +1 TO +20 | 0 | 0 |
| 0 | 0 | 0 |
| -1 TO -10 | 0 | 0 |
| -11 TO -30 | +20 | +20 |
| EQUAL TO OR LESS THAN -31 | +70 | +50 |

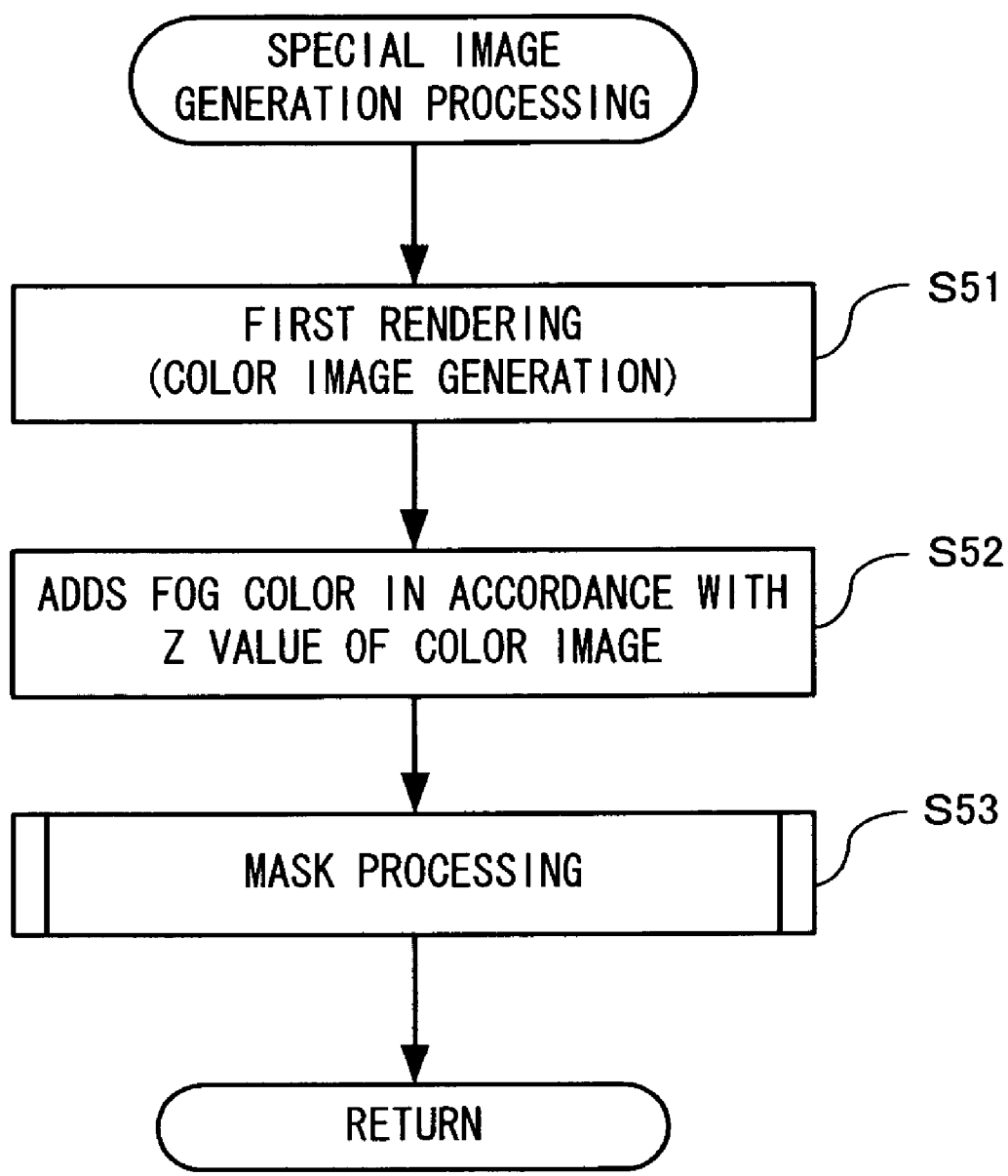

STORAGE MEDIUM HAVING GAME PROGRAM STORED THEREIN AND GAME APPARATUS

BACKGROUND

1. Field of the Technology

The technology presented herein relates to a storage medium having a game program stored therein and a game apparatus and more particularly, to drawing processing of images in a virtual game space.

2. Description of the Background Art

In recent years, as computers included in game systems have grown powerful, three-dimensional games utilizing three-dimensional computer graphics technique are on the increase. In a three-dimensional game, objects such as player objects and landscape objects which are composed of polygons are disposed in a three-dimensional game space and a view of the game space is displayed as a three-dimensional game screen image.

Here, as one of conventional screen image displaying methods, a method in which an image, such as a monochrome image, whose color information is changed so as to be different from an image normally displayed is used will be described. For example, there are a plurality of worlds in a virtual game space, which are scenes in a game (hereinafter, referred to as worlds). One of the plurality of worlds is a "monochrome world" in which there set are only black-and-white pixels. In this case, objects in worlds other than the "monochrome world" are displayed as color images and objects in the "monochrome world" are all displayed as monochrome images. A difference between the "monochrome world" and other worlds is represented by making all objects in the "monochrome world" black-and-white (for example, see Famitsu Weekly, ENTERBRAIN INC. a September 9th edition, pages 274 to 275).

However, the above-mentioned screen displaying method conventionally has a problem as described below. In the above-mentioned "monochrome world", a monochrome screen image is simply displayed and only a player object is colored, resulting in a monotonous representation. Further, since a background is a monochrome screen image, it is difficult to gain a sense of distance and it is difficult for a player to grasp a position of the player object in a virtual game space.

SUMMARY

Therefore, a feature of an example embodiment presented herein is to provide a game apparatus which allows easy grasping of a position of a player object in representation of a screen image whose color information is changed so as to be different from an image normally displayed, and a storage medium having a game program stored therein.

The example embodiment has the following features to attain the above. The reference numerals, supplementary explanations, and the like provided in parentheses merely illustrate correspondence with the below-described embodiment for assisting in the understanding of the example embodiment, and by no means limit the scope of the example embodiment.

A first aspect of the example embodiment is directed to a storage medium having stored therein a game program which causes a computer in a game apparatus for updating and displaying, at intervals of unit time, an image of a virtual game space, which is shot by a virtual camera, to execute: an image generation step (S31), a first color blending step (S32), a second color blending step (S33), and an output step (S6). The image generation step generates the image of the virtual game space, which is shot by the virtual camera. The first color blending step blends, at a rate which is calculated in accordance with a distance from a predetermined reference position to another position in the virtual game space in a shooting direction of the virtual camera, a first color into a color at the another position in the image generated at the image generation step. The second color blending step blends, at a rate which is calculated in accordance with a distance from a predetermined reference pixel to another pixel in the image into which the first color has been blended at the first color blending step, a second color into a color at the another pixel. The output step outputs the image which has been processed at the second color blending step.

In a second aspect, the rate of blending the first color into another pixel is decreased in accordance with a decrease in the distance from the reference position to the another position in the shooting direction of the virtual camera in the virtual game space.

In a third aspect, the reference pixel is a pixel corresponding to the reference position.

In a fourth aspect, the reference position is a position of the player object existing in the virtual game space.

In a fifth aspect, the rate of blending the second color into the another pixel is decreased in accordance with a decrease in the distance from the reference pixel to the another pixel.

A sixth aspect is directed to a storage medium having stored therein a game program which causes a computer in a game apparatus for updating and displaying, at intervals of unit time, an image of a virtual game space, which is shot by a virtual camera, to execute: an image generation step (S31), a third color blending step (S33), a fourth color blending step (S32), and an output step (S6). The image generation step generates the image of the virtual game space, which is shot by the virtual camera. The third color blending step blends, at a rate which is calculated in accordance with a distance from a predetermined reference pixel to another pixel in the image generated at the image generation step, a third color into a color at the another pixel. The fourth color blending step blends, at a rate which is calculated in accordance with a distance from a predetermined reference position to another position in the virtual game space in a shooting direction of the virtual camera, a fourth color into a color at the another position in the image into which the third color has been blended at the third color blending step. The output step outputs the image which has been processed at the fourth color blending step.

In a seventh aspect, the rate of blending the fourth color into the pixel is decreased in accordance with a decrease in the distance from the reference position to the another position in the shooting direction of the virtual camera in the virtual game space.

In an eighth aspect, the reference pixel is a pixel corresponding to the reference position.

In a ninth aspect, the reference position is a position of the player object existing in the virtual game space.

In a tenth aspect, the rate of blending the third color into the another pixel is decreased in accordance with a decrease in the distance from the reference pixel to the another pixel.

An eleventh aspect is directed to a storage medium having stored therein a game program which causes a computer in a game apparatus for storing in a frame buffer a game image obtained through shooting by means of a virtual camera and storing in a Z buffer a depth value of a pixel of the game image, to execute: a first color blending step (S52), a second color blending step (S53), and an output step (S6). The first color blending blends, at a rate which is calculated in accordance with a difference between a reference value which is a depth value of a predetermined pixel and a depth value of another pixel in the game image, a first color into the another pixel in the game image. The second color blending step blends, at a rate which is calculated in accordance with a distance from a reference pixel, which is a predetermined pixel, to another pixel in the game image into which the first color has been blended at the first color blending step, a second color into the another pixel. The output step outputs the image which has been processed at the second color blending step.

In a twelfth aspect, the rate of blending the first color into the another pixel is decreased in accordance with a decrease in the difference between the reference value and the depth value of the another pixel.

In a thirteenth aspect, the reference pixel is a pixel corresponding to the reference value.

In a fourteenth aspect, the pixel corresponding to the reference value is a pixel corresponding to a position of the player object existing in the virtual game space.

In a fifteenth aspect, the rate of blending the second color into the another pixel is decreased in accordance with a decrease in the distance from the reference pixel to the another pixel.

A sixteenth aspect is directed to a storage medium having stored therein a game program which causes a computer in a game apparatus for storing in a frame buffer a game image obtained through shooting by means of a virtual camera and storing in a Z buffer a depth value of a pixel of the game image, to execute: a third color blending step (S53), a fourth color blending step (S52), and an output step (S6). The third color blending step blends, at a rate which is calculated in accordance with a distance from a reference pixel, which is a predetermined pixel, to another pixel in the game image into which the color has been blended, a third color into the another pixel. The fourth color blending step blends, at a rate which is calculated in accordance with a difference between a reference value, which is a depth value of a predetermined pixel, and a depth value of another pixel in the game image into which the third color has been blended at the third color blending step, a fourth color into the another pixel in the game image. The output step outputs the image which has been processed at the fourth color blending step.

In a seventeenth aspect, the rate of blending the color into the another pixel is decreased in accordance with a decrease in the difference between the reference value and the depth value of the another pixel.

In an eighteenth aspect, the reference pixel is a pixel corresponding to the reference value.

In a nineteenth aspect, the reference pixel is a pixel corresponding to a position of the player object existing in the virtual game space.

In a twentieth aspect, the rate of blending the color into the another pixel is decreased in accordance with a decrease in the distance from the reference pixel to the another pixel.

A twenty-first aspect is directed to a game apparatus for updating and displaying, at intervals of unit time, an image of a virtual game space, which is shot by a virtual camera, comprising: an image generation section (22, 24), a first color blending section (22, 24), a second color blending section (22, 24), and an output section (22, 24). The image generation section generates the image of the virtual game space, which is shot by the virtual camera. The first color blending section blends, at a rate which is calculated in accordance with a distance from a predetermined reference position to another position in the virtual game space in a shooting direction of the virtual camera, a first color into a color at the another position in the image generated by the image generation section. The second color blending section blends, at a rate which is calculated in accordance with a distance from a predetermined reference pixel to another pixel in the image into which the first color has been blended by the first color blending section, a second color into the color at the another pixel. The output section outputs the image which has been processed by the second color blending section.

A twenty-second aspect is directed to a game apparatus for updating and displaying, at intervals of unit time, an image of a virtual game space, which is shot by a virtual camera, comprising: an image generation section (22, 24), a third color blending section (22, 24), a fourth color blending section (22, 24), and an output section (22, 24). The image generation section generates the image of the virtual game space, which is shot by the virtual camera. The third color blending section blends, at a rate which is calculated in accordance with a distance from a predetermined reference pixel to another pixel in the image generated by the image generation section, a third color into the color at the another pixel. The fourth color blending section blends, at a rate which is calculated in accordance with a distance from a predetermined reference position to another position in the virtual game space in a shooting direction of the virtual camera, a fourth color into a color at the another position in the image into which the third color has been blended by the third color blending section. The output section outputs the image which has been processed by the fourth color blending section.

A twenty-third aspect is directed to a game apparatus for storing in a frame buffer a game image obtained through shooting by means of a virtual camera and storing in a Z buffer a depth value of a pixel of the game image, comprising: a first color blending section (22, 24), a second color blending section (22, 24), and an output section (22, 24). The first color blending section blends, at a rate which is calculated in accordance with a difference between a reference value, which is a depth value of a predetermined pixel, and a depth value of another pixel in the game image, a first color into the another pixel in the game image. The second color blending section blends, at a rate which is calculated in accordance with a distance from a reference pixel which is a predetermined pixel in the game image, into which the first color has been blended by the first color blending section, to another pixel, a second color into the another pixel. The output section outputs the image which has been processed by the second color blending section.

A twenty-fourth aspect is directed to a game apparatus for storing in a frame buffer a game image obtained through shooting by means of a virtual camera and storing in a Z buffer a depth value of a pixel of the game image, comprising: a third color blending section (22, 24), a fourth color blending section (22, 24), and an output section (22, 24). The third color blending section blends, at a rate which is calculated in accordance with a distance from a reference pixel, which is a predetermined pixel in the game image, to another pixel in the game image into which the color has been blended, a third color into the another pixel. The fourth color blending section blends, at a rate which is calculated in accordance with a difference between a reference value, which is a depth value of a predetermined pixel, and a depth value of another pixel in the game image into which the third color has been blended by the third color blending section, a fourth color into the another pixel in the game image. The output section outputs the image which has been processed by the fourth color blending section.

According to the first aspect, a game image in which a predetermined color is added in accordance with a distance from a predetermined reference position in the virtual game space can be displayed. Thereby the reference position in the virtual game space can be displayed in an easily visible manner.

According to the second aspect, a game image in which a predetermined color is added in accordance with a distance from the reference position in a gradual manner can be displayed. Thereby the reference position in the virtual game space can be displayed in an easily visible manner.

According to the third aspect, since the reference pixel is a pixel corresponding to the reference position, an origin point of blending the first color can be same as an origin point of blending the second color. Thereby, as a whole, colors can be blended in a well-balanced manner. The reference position can be displayed so that a player can easily see the reference position.

According to the fourth aspect, a position of the player object in the virtual game space can be displayed so that a player can easily grasp the position, thereby allowing a player to easily operate the player object.

According to the fifth aspect, a player can easily feel a sense of distance in the virtual game space. The reference position in the virtual game space can be displayed in an easily visible manner.

According to the sixth, the eleventh, and the sixteenth aspects, effect similar to that of the first aspect can be obtained.

According to the seventh, the eighth, the ninth, the twelfth, the thirteenth, the fourteenth, the seventeenth, the eighteenth, and the nineteenth aspects, effect similar to that of the second, the third, and the fourth aspects can be obtained.

According to the tenth, the fifteenth, and the twentieth aspects, effect similar to that of the fifth aspect can be obtained.

According to the twenty-first, the twenty-second, the twenty-third, and the twenty-fourth aspects, effect similar to that of the first aspect can be obtained.

These and other, features, aspects and advantages of the example embodiment presented herein will become more apparent from the following detailed description of the example embodiment when taken in conjunction with the accompanying drawings.

BRIEF DESCRIPTION OF THE DRAWINGS

FIG. 8A is a diagram explaining an outline of mask processing;

FIG. 8B is a diagram explaining an outline of mask processing;

FIG. 9 shows an example of a mask table for an X direction when a player object is in a state of a human being;

FIG. 10 shows an example of a mask table for a Y direction when a player object is in a state of a human being;

FIG. 11 shows an example of a mask table for an X direction when a player object is in a state of a wolf;

FIG. 12 shows an example of a mask table for a Y direction when a player object is in a state of a wolf;

FIG. 17 is a flowchart showing detailed special image generation processing performed when second rendering processing is not performed.

DESCRIPTION OF THE PREFERRED EMBODIMENTS

Figure 1:
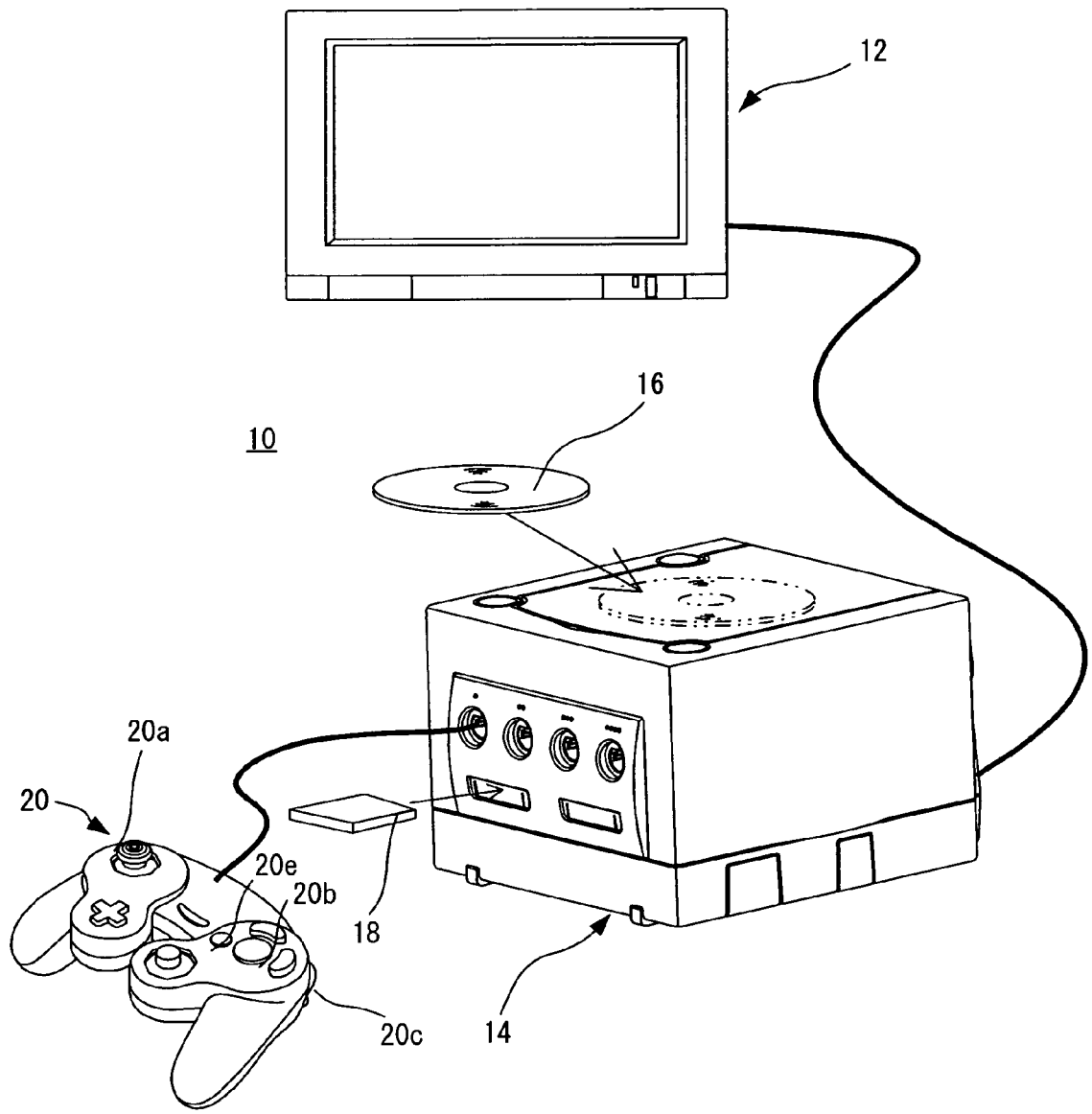
FIG. 1 is an external view illustrating a structure of a game system according to one embodiment.
Figure 2:
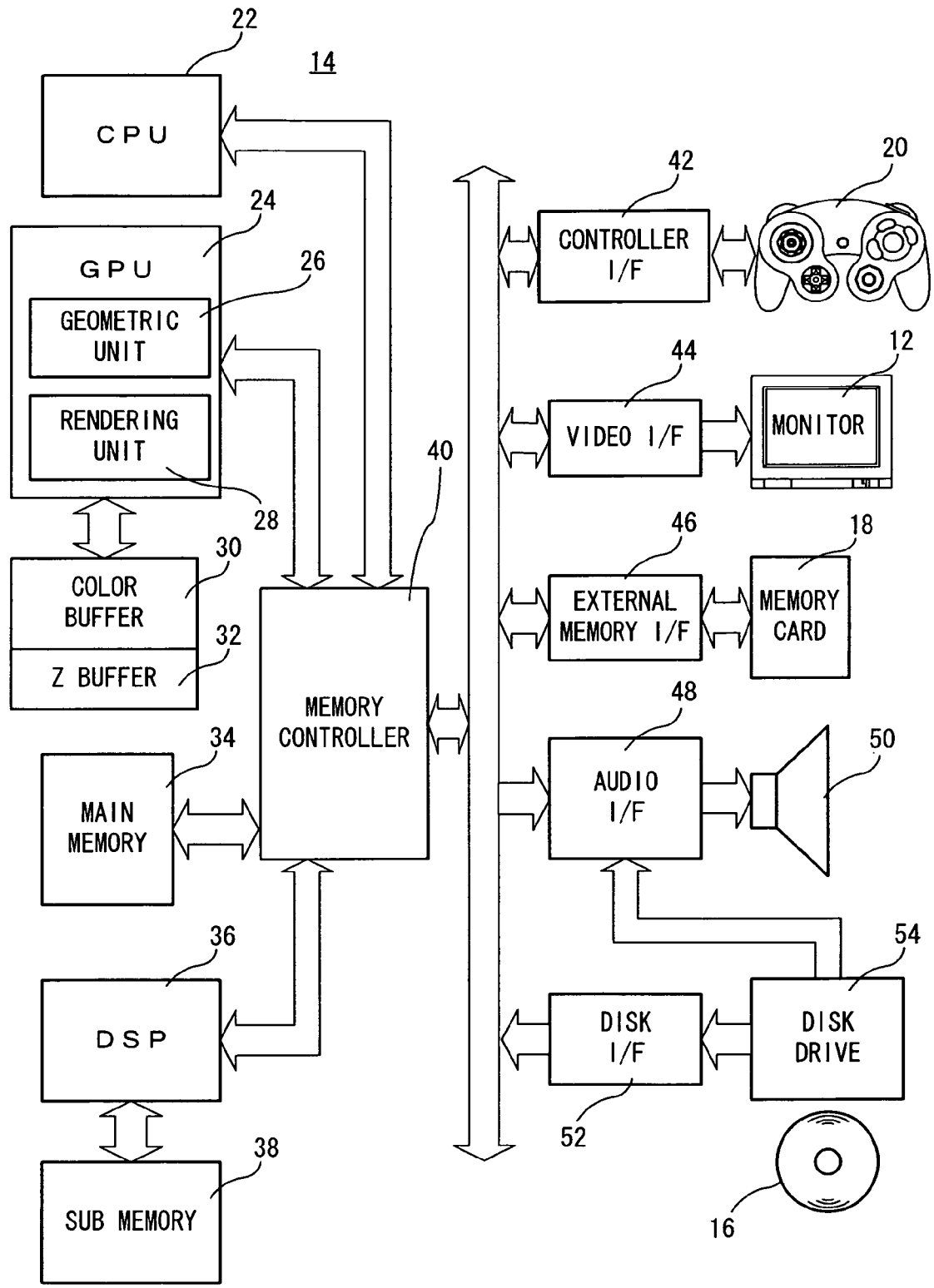
FIG. 2 is a block diagram of the game system shown in FIG. 1.

FIG. 1 is an external view illustrating a structure of a game system according to one embodiment, and FIG. 2 is a block diagram of the game system shown in FIG. 1. As shown in FIGS. 1 and 2, a game system 10 includes a game apparatus 14, an optical disc 16, a memory card 18, a controller 20, and a monitor 12 having a speaker 50 shown in FIG. 2. The optical disc 16 and the memory card 18 are detachably mounted on the game apparatus 14. The controller 20 is connected to one of a plurality (for example, four as shown in FIG. 1) of controller port connectors of the game apparatus 14. The controller 20 has a plurality of operation sections such as a joystick 20a, an A button 20b, an R button 20c, a B button 20e, and a Z button (which is not shown). According to another embodiment, the controller 20 may wirelessly communicate with the game apparatus 14, that is, no communication cable is used in this case. The monitor 12 and the speaker 50 are connected to the game apparatus 14 via an AV cable and the like. While FIG. 1 shows that the example embodiment presented herein is realized as a stationary game apparatus, the example embodiment can be realized as a hand-held game apparatus, an arcade game apparatus, an apparatus such as a mobile telephone or a personal computer capable of executing a program. Hereinafter, with reference to FIG. 2, respective components and a typical operation of the game system according to the example embodiment will be described in detail.

The optical disc 16 such as a DVD-ROM is used as an example of an external storage medium. The optical disc 16 fixedly stores data, such as character data, relating to a game and a game program. When a player plays a game, the optical disc 16 is mounted on the game apparatus 14. A means for storing the game program and the like is not restricted to a DVD-ROM. The means for storing the game program and the like may be a storage medium such as a CD-ROM, an MO, a memory card, or a ROM cartridge. Alternatively, a game program downloaded through communication may be stored in a storage means such as a memory or a hard disk incorporated in the game apparatus. The memory card 18 is, for example, are writable storage medium such as a flash memory. The memory card 18 stores data such as saved data for a game.

The game apparatus 14 reads the game program stored in the optical disc 16 so as to perform a game process. The controller 20 is an input device used for a player to make an input for game play and has the joystick and a plurality of the operation switches as described above. The controller 20 outputs operation data to the game apparatus 14 in accordance with the joystick being operated by the player, or the operation buttons having been pressed by the player. The monitor 12 displays, on a screen, image data outputted by the game apparatus 14. The speaker 50, which is typically incorporated in the television set 12, outputs sound for a game outputted by the game apparatus 14. When two or more players play the game, the number of the controllers 20 provided is the same as the number of the players.

Next, a structure of the game apparatus 14 will be described. As shown in FIG. 2, the game apparatus 14 includes a CPU 22 and a memory controller 40 connected to the CPU 22. Further, in the game apparatus 14, the memory controller 40 is connected to a graphics processing unit (GPU) 24, a main memory 34, a digital signal processing circuit (DSP) 36, and various interfaces (I/Fs) 42 to 52. Via the DSP 36, the memory controller 40 is connected to a sub-memory 38. The memory controller 40 controls data transfer among the respective components.

At the start of a game, a disc drive 54 initially drives the optical disc 16 mounted on the game apparatus 14. The game program stored on the optical disc 16 is loaded to the main memory 34 via a disc I/F 52 and the memory controller 40. When the CPU 22 executes the program on the main memory 34, the game is started. After the game is started, a player makes an input to the controller 20 for game play using the joystick and the operation switches. In accordance with the input having been made by the player, the controller 20 outputs operation data to the game apparatus 14. The operation data outputted by the controller 20 is inputted to the CPU 22 via a controller I/F 42 and the memory controller 40. The CPU 22 is operable to perform a game process in accordance with the operation data having been inputted thereto. When generating image data and the like during the game process, the GPU 24 and the DSP 36 are used. Further, the sub-memory 38 is used when the DSP 36 performs a predetermined process.

The GPU 24 includes a geometry unit 26 and a rendering unit 28, and is connected to a memory dedicated to image processing. The memory dedicated to image processing is used as, for example, a color buffer 30 and a Z buffer 32. The geometry unit 26 performs calculation for coordinates of a solid model of an object and a graphic in a game space representing a virtual three-dimensional space (for example, a solid model of an object of a polygon). For example, the geometry unit 26 rotates, enlarges, downsizes, and transforms the solid model, and further converts coordinates in a world coordinate system into coordinates in a viewpoint coordinate system or into coordinates in a screen coordinate system. The rendering unit 28 writes, for each pixel, color data (RGB data) of the solid model projected on the screen coordinate system into the color buffer 30 based on a predetermined texture, thereby generating a game image. Further, the color buffer 30 is a memory area allocated so as to store game image data (RGB data) generated by the rendering unit 28. The Z buffer 32 is a memory area allocated so as to store, when the three-dimensional viewpoint coordinates are converted into two-dimensional screen coordinates, information of the depth dimension as seen from the viewpoint. The GPU 24 generates image data to be displayed on the television set 12 using the geometry unit 26, the rendering unit 28, the color buffer 30, and the Z buffer 32, and outputs the generated image data to the television set 12 via the memory controller 40 and a video I/F 44 as necessary. Sound data generated by the CPU 22 at the execution of the game program is outputted from the memory controller 40 to the speaker 50 via an audio I/F 48. Although in the present embodiment the memory dedicated to image processing is provided, a UMA (Unified Memory Architecture) may be adopted in which a portion of the main memory 34 is used as a memory for image processing, for example. The game apparatus 14 transfers game data generated by executing the game program to the memory card 18 via the memory controller 40 and an external memory I/F 46. Further, the game apparatus 14 loads game data stored in the memory card 18 into the main memory 34 via the memory controller 40 and a memory I/F 46 before the game is started.

Next, an outline of a game which is assumed to be played in the present embodiment will be described. The game of the present embodiment is an action and adventure game in which a player object adventures while moving about in a virtual 3D game space in a real-time manner. The player object, an enemy object, and other background objects appear in the virtual game space, are shot by a virtual camera, and thereby are displayed as game images on the monitor 12.

Here, in the virtual game space of the present embodiment, there are two kinds of worlds which are referred to as a "normal world" and a "twilight world". In the "normal world", the player object plays an active role and the entering "twilight world" is allowed only when a predetermined condition is satisfied. As game images of the "normal world" and the "twilight world", images viewed from the virtual camera are displayed. Unlike the image of the "normal world" (hereinafter, referred to as a normal image), as the game image of the "twilight world", an image to which special effects are given (hereinafter, referred to as a special effect image) is displayed. Specifically, the "twilight world" is represented by an image which is monochrome in whole and not colorful as compared with that of the "normal world". However, also in the "twilight world", the player object is displayed being colored, as similarly to the images displayed in the "normal world". In order for a position of the player object in the "twilight world" to be easily seen, a color image, as similarly to the images in the "normal world", is displayed around the player object. And the more distant portions of the color image are from the player object, the paler the color of the portions gradually get. In other words, like a candle lit in the dark, only a portion around a candle (player object) is made luminous (as a color image) and the more distant portions of a background are from the candle, the darker the portions gradually get (the paler the color gets). A special effect image to which special effects are given in the above-mentioned manner is displayed as a game image.

Figure 3:
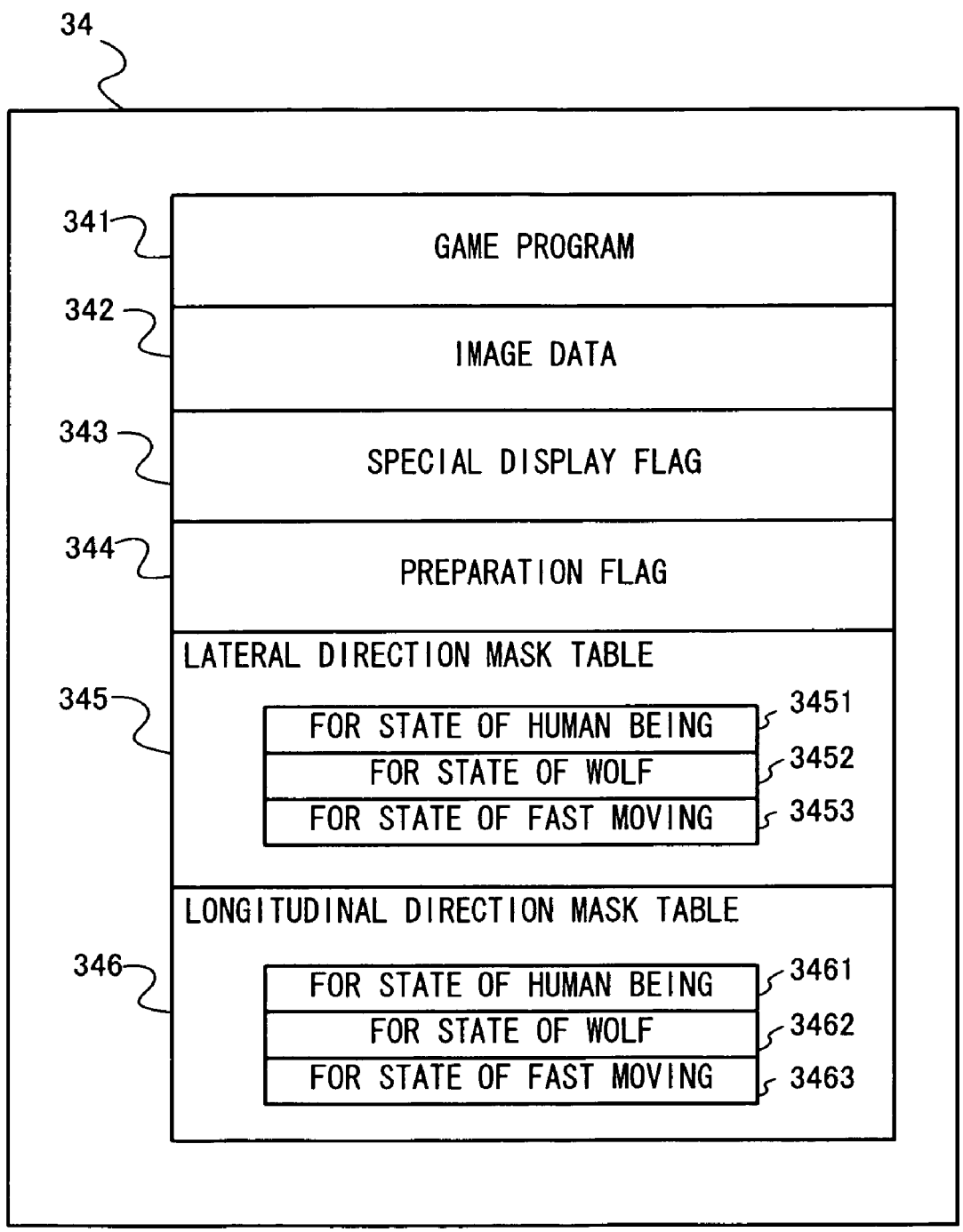
FIG. 3 is a diagram showing a memory map of a main memory.

Next, game processing executed by the game apparatus 14 will be described in detail. First, data stored in the main memory 34 upon game processing will be described. FIG. 3 is a diagram showing a memory map of the main memory 34 in the game apparatus 14. Upon the game processing, stored in the main memory 34 are a game program 341 which is read from the optical disk 16, image data 342, a special display flag 343, a preparation flag 344, a lateral direction mask table 345, a longitudinal direction mask table 346, and the like.

Figure 4:
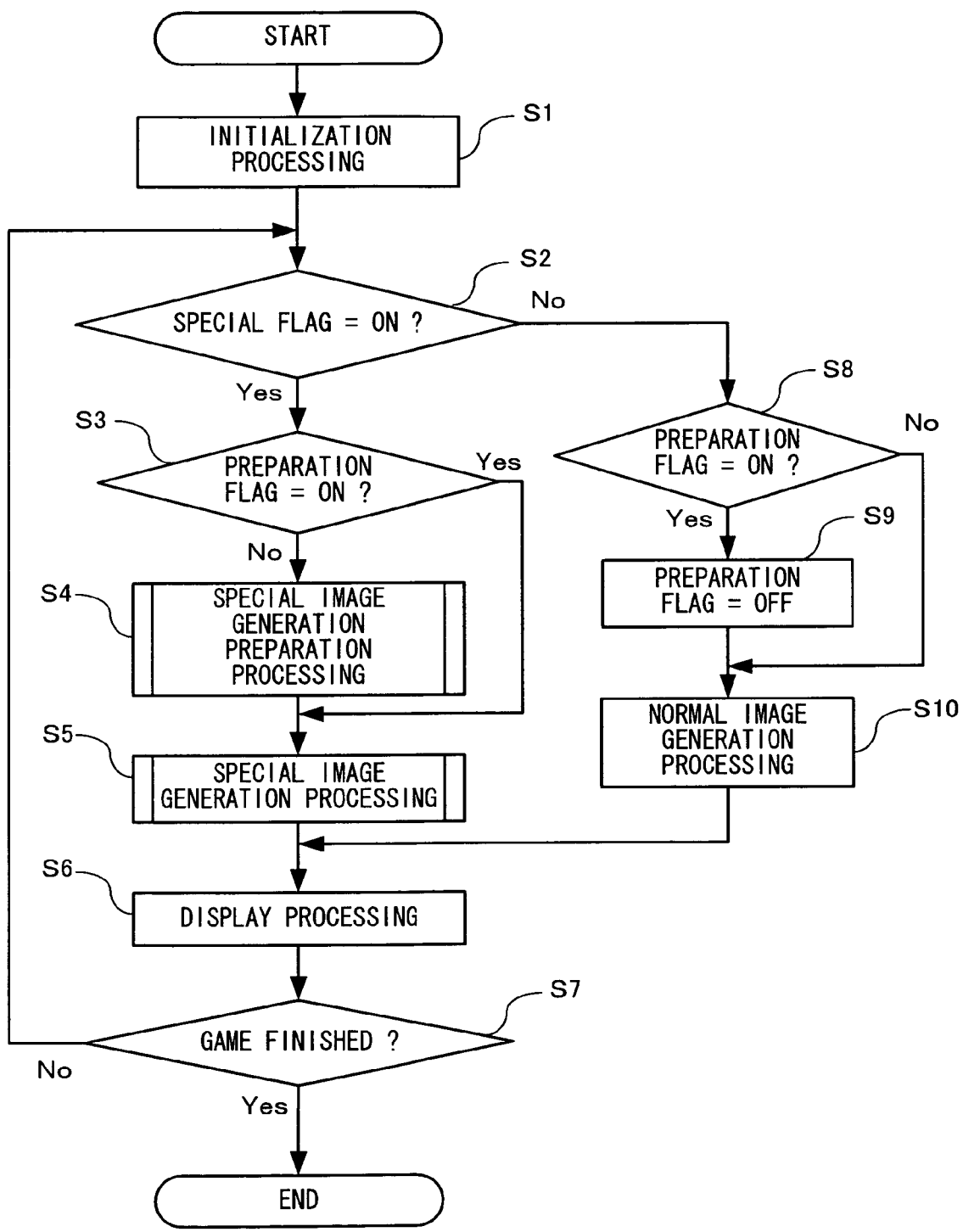
FIG. 4 is a flowchart of game processing.

The game program 341 is to operate the CPU 22 (to execute operations in a flowchart shown in FIG. 4 which is described hereinafter).

The image data 342 is data (such as polygon data and texture data) for generating game images (the player object, the enemy object, the background object, a predetermined character)

The special display flag 343 indicates whether the above-mentioned normal image or special effect image is displayed as a game image to be displayed on the monitor 12. The special display flag 343 is set to be on when the player object is in the above-mentioned "twilight world" and off when the player object is in the "normal world". The preparation flag

344 determines whether or not special image generation preparation processing (details thereof will be described hereinafter) is executed.

The lateral direction mask table 345 and the longitudinal direction mask table 346 are used for mask processing (details thereof will be described hereinafter).

In the main memory 34, data, other than the above-mentioned data, which indicates a state of the player object (such as HP and weapons carried) is stored. Further a variety of data used for the game processing is stored in the main memory 34.

Next, referring to FIG. 4, game processing executed by the game apparatus 14 will be described. FIG. 4 is a flowchart showing the whole game processing executed by the game apparatus 14. In FIG. 4, first, initialization processing for the special display flag 343 and the like is performed by the CPU 22 (step S1). Next, whether or not the special display flag 343 is on is determined (step S2). In other words, whether the special effect image or the normal image is generated (whether or not the player object is in the "twilight world") is determined. When the special display flag 343 is off (NO at step S2), subsequently, it is determined whether or not the preparation flag 344 indicating whether or not the special display preparation processing is completed is off (step S8). When the preparation flag 344 is on (YES at step S8), the preparation flag is turned off (step S9) and the CPU 22 proceeds to step S10. On the other hand, when the preparation flag is off (NO at step S8), the CPU 22 proceeds to step S10. At step S10, processing for generating the normal image is performed (step S10). More specifically, a modeling coordinate system which is coordinate data of polygons configuring respective objects in the game space is converted to a viewpoint coordinate system in which a position of the virtual camera is an origin point. And calculations with respect to effects such as perspective and portions hidden behind objects in the front are made and projection transformation is performed. Lastly, conversion to a screen coordinate system is performed for displaying a screen image, whereby an image viewed from the virtual camera is generated and stored in a frame buffer (hereinafter, the above-mentioned series of processes is referred to as rendering processing). Thereafter, the CPU 22 proceeds to step S6.

On the other hand, when the special display flag 343 is on (YES at step S2), subsequently, whether or not the preparation flag 344 is on is determined (step S3). When the preparation flag 344 is on (YES at step S3), the CPU 22 proceeds to step S5 which is described hereinafter. When the preparation flag 344 is off (NO at step S3), special image preparation processing described below is performed (step S4).

Here, an outline of the special image generation preparation processing (step S4) and special image generation processing (step S5) will be described. First, in the special image generation processing at step S5, two images are generated and stored in a frame buffer. One of the two images is a first image (hereinafter, referred to as a color image) obtained by rendering as similarly at step S10 described above. The other of the two images is a second image (hereinafter, referred to as a fog image) generated by rendering with effects of fog added (hereinafter, referred to as fog processing). And the fog image is mask-processed (details are described below) and the color image as a background and the fog image as a foreground are synthesized, whereby finally the special effect image to be displayed on a screen as a game image is generated. Various parameters required for the fog processing are set in the special image generation preparation processing at step S4.

Next, an outline of the fog processing in the present embodiment will be described. The fog processing in the present embodiment is performed while the rendering is performed. Specifically, the above-mentioned color image is first generated and fog effects are added to the color image, whereby an image viewed from the above-mentioned virtual camera is generated. The addition of the fog effects is made by adding a color specified as a fog color (hereinafter, simply referred to as a fog color) to color information (RGB) of pixels of the respective objects in accordance with Z values of the respective objects (including the background object). For example, first, white (RGB values=255, 255, 255) is specified as a fog color. Next, a fog termination distance is specified, for example, as 100. This fog termination distance is a distance from a starting point (Z value at which the fog processing is started) in a depth direction. For example, suppose that a polygon colored with red (RGB values=255, 0, 0) is at a position at which the Z value is 10 (which is a starting point). And as the polygon moves on a camera coordinate system in the depth direction, the polygon is gradually being colored with white. When the polygon comes to at a position at which the Z value is 100, the polygon which is completely colored with white is displayed. In such a manner, in the fog processing, the fog color is gradually added to the RGB values in accordance with the Z value.

When adding this fog color, alpha values indicating transparency are also set. In other words, respective pixels of the fog image have parameters, i.e., alpha values, in addition to the above-mentioned RGB values. This setting is made so that when in the special image generation processing, a color image and a fog image are synthesized, predetermined pixels of the fog image which is a foreground are transparent and thereby the color image of the background can appear. More specifically, in the special effect image generated by the special image generation processing, the color image appears with the fog image transparent, whereby the player object and a periphery thereof appear. And the more distant portions of the fog image are from the player object, the less transparent the portions of the fog image are, whereby the color image is disappearing.

Figure 5:
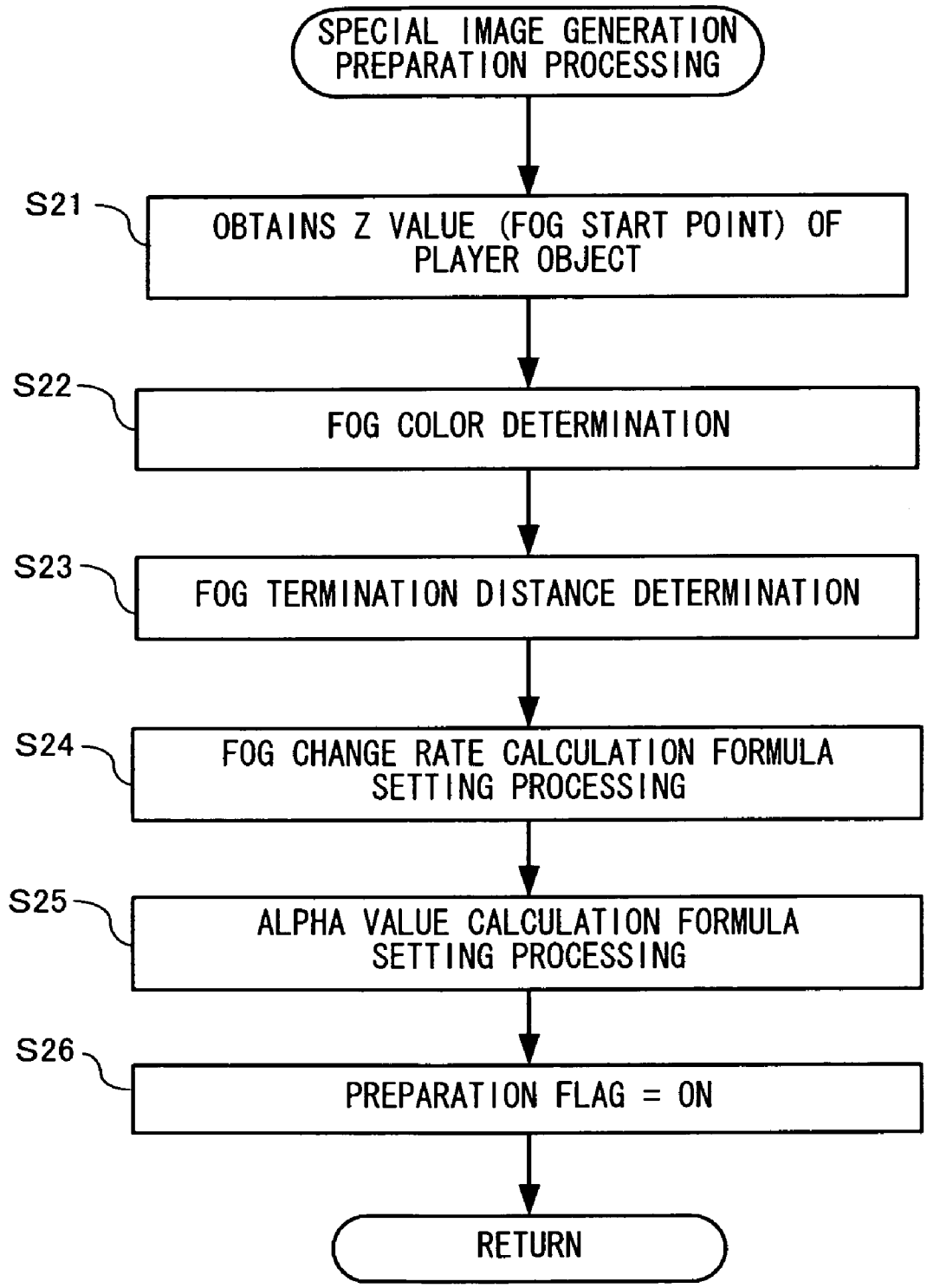
FIG. 5 is a flowchart showing detailed special image generation preparation processing at step S4 in FIG. 4.

Next, the above-mentioned special image generation preparation processing will be described in detail. FIG. 5 is a flowchart showing the special image generation preparation processing shown at step S4 described above. In FIG. 5, first, a Z value of a player object is obtained (step S21). This is a starting point of fog processing in the special image generation preparation processing. Next, a fog color is determined (step S22). The fog color is determined in accordance with a state of an area where the player object is and a state of the player object. For example, when the player object is in a state of a human being, white (RGB values=255, 255, 255) is specified as a fog color and when the player object is transformed into a wolf, blue (RGB values=0, 0, 255) is specified as a fog color. Hereinafter, description in a case where white is specified as a fog color will be given.

Figure 6:
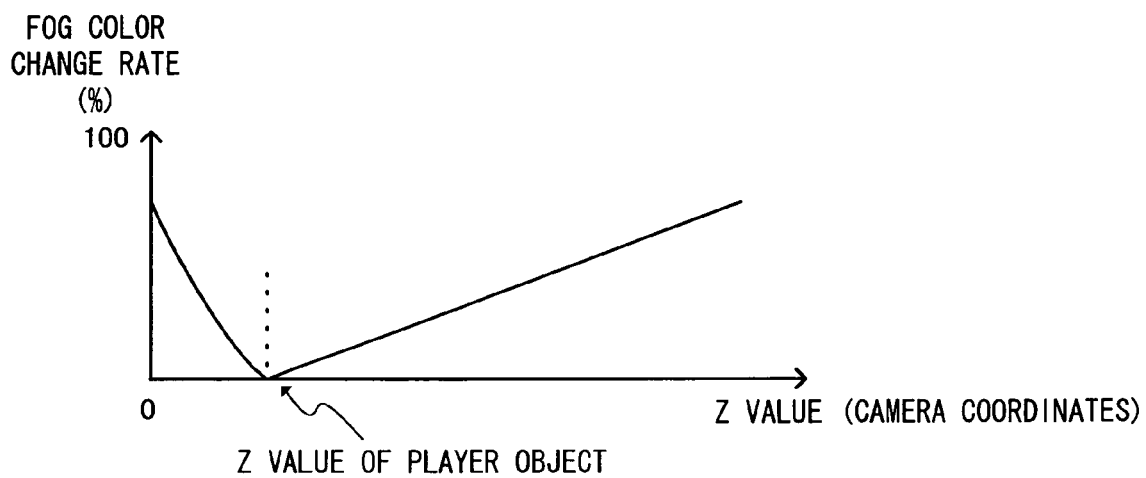
FIG. 6 is a graph showing an example of calculation of a change rate of a fog color.

Next, a fog termination distance is determined (step S23). Specifically, a Z value of a sight point of the virtual camera is a value of the fog termination distance. Next, a formula for calculating a change rate (rate of adding a fog color) of the fog color is generated (step S24). For example, the formula is generated so that a relationship between a change rate of the fog color and the Z value is as shown in a graph in FIG. 6. In other words, as shown in FIG. 6, generated is the formula by which a rate of the above-mentioned fog color to be added in accordance with a difference between a Z value of the above-mentioned starting point (a position of the player object) and a Z value of a target point (a + value for leaving from the virtual camera and a − value for approaching the virtual camera) is calculated.

Figure 7:
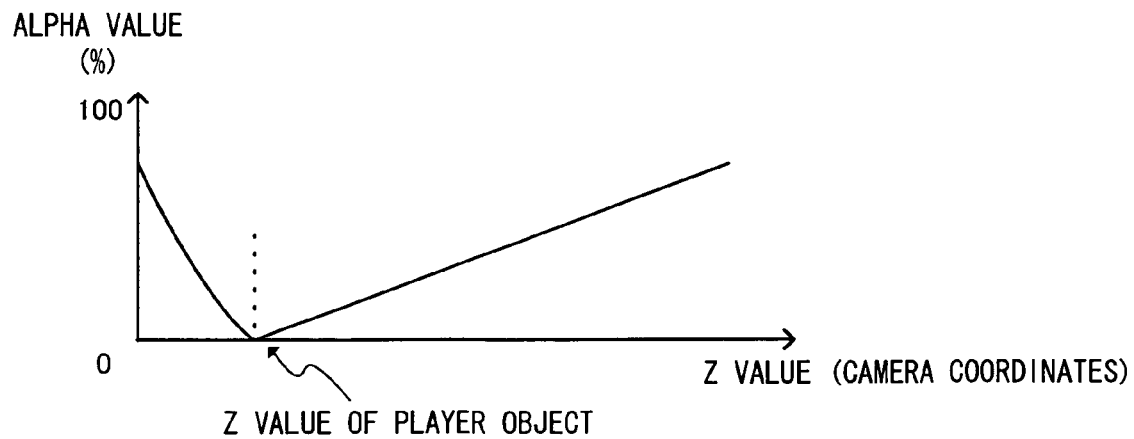
FIG. 7 is a graph showing an example of setting of an alpha value.

Next, a formula for setting an alpha value is generated (step S25). For example, as shown in FIG. 7, the formula by which the alpha value is calculated is generated. In other words, as shown in FIG. 7, generated is the formula by which the alpha value to be set in accordance with a difference between a Z value of the above-mentioned starting point and a Z value of a targeted point (a + value for leaving from the virtual camera and a − value for approaching the virtual camera) is calculated. The alpha value to be calculated here is in a range of 0 to 100% and 0% of the alpha value shows complete transparency. Lastly, in order to show that the preparation processing has been finished, the above-mentioned preparation flag 344 is turned on (step S26). The special image generation preparation processing at step S4 ends.

Referring back to FIG. 4, after the above-mentioned preparation processing has ended, the special image generation processing is performed (step S5). Here, before the special image generation processing at step S5 is described in detail, an outline of mask processing performed in the special image generation processing will be described. As described above, in the special image generation processing at step S5, a color image is generated by first rendering processing and a fog image in which fog effects based on parameters which have been set in the above-mentioned preparation processing is given is generated by second rendering processing. And these two images of the color image and the fog image which are a background and a foreground respectively are synthesized. Before the synthesis, mask processing in a lateral direction and a longitudinal direction of the fog image is performed for the above-mentioned fog image. When only the above-mentioned fog processing is performed, as shown in FIG. 8A, a fog color and an alpha value of the player object is same as those of objects in a lateral direction and a longitudinal direction. Therefore, as shown in FIG. 8B, through performing the mask processing, color information (RGBα) of predetermined pixels in the fog image is corrected so that a fog color and an alpha value are decreased with respect to a periphery of the player object and a fog color and an alpha value are increased with respect to the other objects in a lateral direction and longitudinal direction in a gradual manner. In the mask processing, with reference to a predetermined point of the fog image (which is a foot of the player object and hereinafter, referred to as a mask reference point), a fog color and an alpha value with respect to predetermined pixels (specifically, pixels whose alpha values are equal to or less than a predetermined value) in the lateral direction and the longitudinal direction are corrected based on the lateral direction mask table and the longitudinal direction mask table. In accordance with a state of the player object, a plurality of different mask tables are previously prepared. For example, the player object is transformed by switching between a state of a human being and a state of a wolf. When the player object is in the state of a human being, mask tables 3451 and 3461 for the state of a human being, as shown in FIGS. 9 and 10, are used. And when the player object is in the state of a wolf, mask tables 3452 and 3462 for the state of a wolf, as shown in FIGS. 11 and 12, are used. Here, description will be continued provided that the mask tables for the state of a human being are used.

FIG. 9 shows an example of a lateral direction mask table 3451. FIG. 10 shows an example of a longitudinal direction mask table 3461. In FIG. 9, a distance 81 (pixels) from the above-mentioned mask reference point in a lateral direction (x) corresponds to an alpha adjusting value 82 and a fog color adjusting value 83. In FIG. 10, a distance 91 (pixels) from the above-mentioned mask reference point in a longitudinal direction (y) corresponds to an alpha adjusting value 92 and a fog color adjusting value 93. When the mask processing is performed by using the mask table shown in FIG. 9, color information and an alpha value are not corrected with respect to the mask reference point (the distance 81 is 0). For 10 pixels from the mask reference point in a right direction (+ direction), 10% of the alpha value is added and color information is corrected so that the fog color is increased by 5%. Similarly, For 10 pixels from the mask reference point in a left direction (− direction), 10% of the alpha value is added and color information is corrected so that the fog color is increased by 5%. Thereafter, the more distant pixels are from the mask reference point, the more the alpha value to be added and the fog color are increased. As described above, the alpha value and the fog color in the lateral direction are corrected in accordance with distances from the mask reference point in the right and left directions. The alpha value and the fog color in the longitudinal direction, as similarly in the lateral direction, are corrected in accordance with distances from the mask reference point. However, as shown in FIG. 10, unlike in the lateral direction, no correction is made in a predetermined distance from the mask reference point in the longitudinal direction. This is because a fog color and an alpha value with respect to a height of the player object are not to be corrected.

Figure 13:
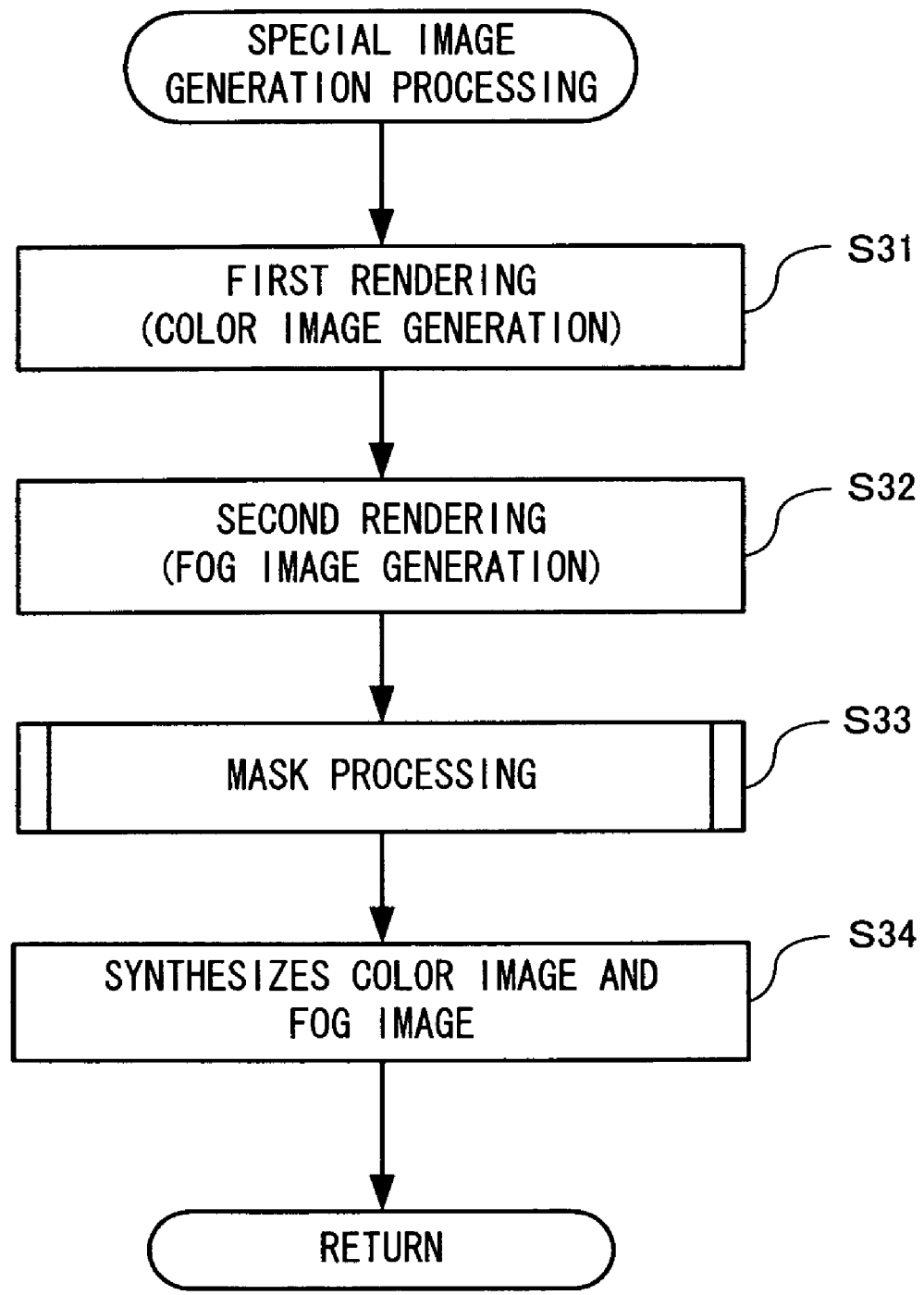
FIG. 13 is a flowchart showing detailed special image generation processing at step S5 in FIG. 4.

FIG. 13 is a flowchart showing detailed special image generation processing at step S5 described above. Referring to FIG. 13, first rendering processing is performed (step S31). Thereby, a color image of a 3D game space obtained by the first rendering is stored in a frame buffer. Next, second rendering processing is performed (step S32). In other words, a color image which is used as a base before adding fog effects is generated. And the fog effects which have been set in the above-mentioned special image generation preparation processing are added to the color image, whereby a fog image is generated. And the fog image is stored in the frame buffer.

Figure 14:
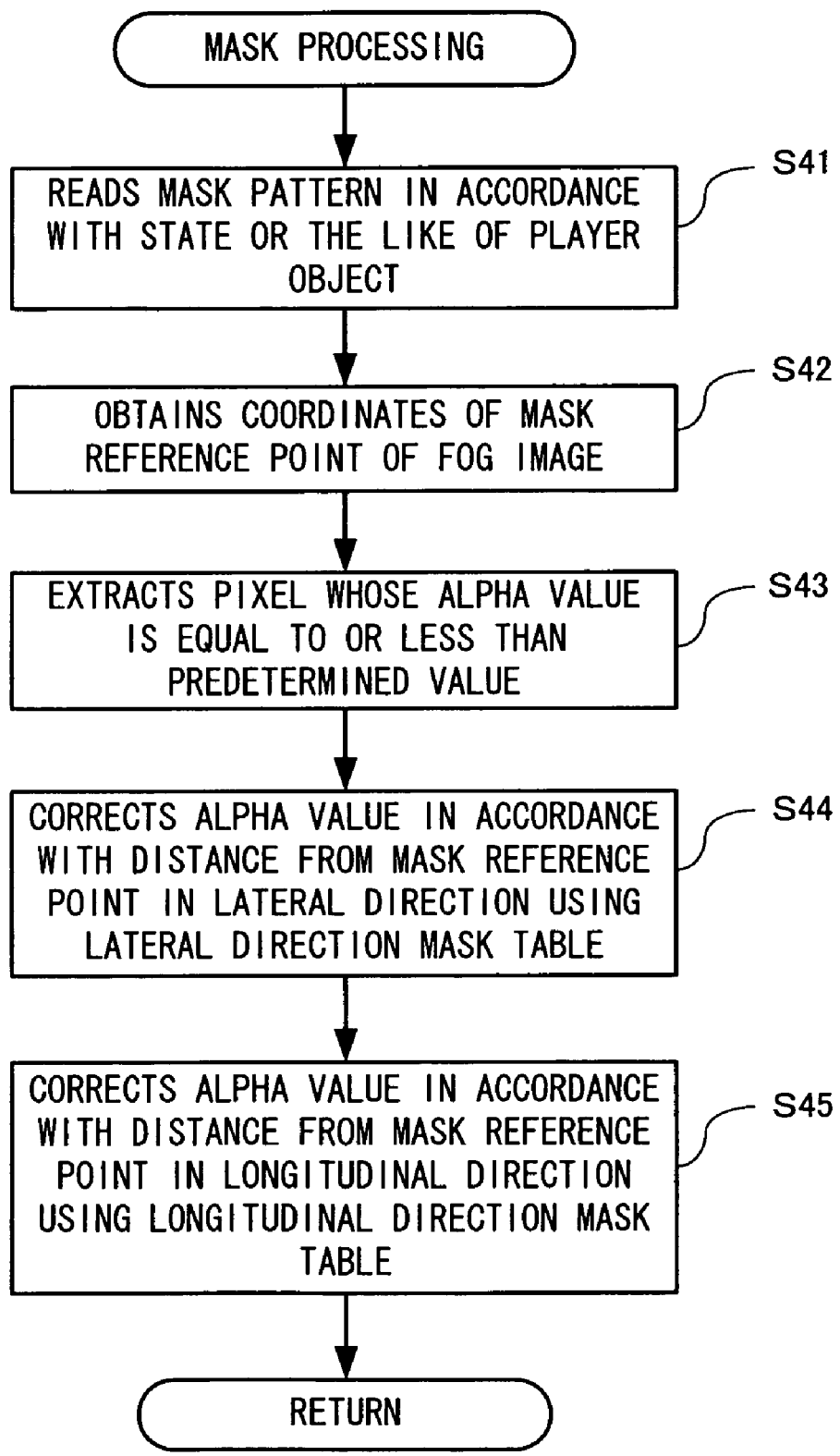
FIG. 14 is a flowchart showing detailed XY mask processing at step S33 in FIG. 12.

Next, the mask processing is performed for the fog image generated at step S32 (step S33). FIG. 14 is a flowchart showing detailed mask processing at step S33 described above. In FIG. 14, the lateral direction mask table 3451 and the longitudinal direction mask table 3461 which are used for the state of a human being are read (step S41). Next, coordinate values of a mask reference point of the fog image is obtained (step S42). Among pixels of the fog image, pixels whose alpha values are equal to or less than a predetermined value, for example, 10%, are extracted (step S43). This is because in consideration of reducing a processing load, only an area surrounding the player object in the 3D game space is targeted for the mask processing.

Next, mask processing in a lateral direction is performed (step S44). The processing at step S44 will be specifically described. Distances (numbers of pixels) between x values (values for the lateral direction) of coordinates of the pixels extracted at step S43 described above and the mask reference point obtained at step S42 described above are calculated. With reference to the lateral direction mask table 3451, the alpha adjusting values 82 corresponding to the distances are added to alpha values of the pixels. RGB values of the pixels are adjusted so that the above-mentioned fog color is increased as indicated by the fog color adjusting values 83 of the lateral direction mask table. In other words, the fog color is intensified by a rate indicated by the fog color adjusting value 83.

Next, mask processing in a longitudinal direction is performed (step S45). In the processing at step S45, as similarly to the processing at step S44, distances between y values (values in the longitudinal direction) of coordinates of the pixels extracted at step S43 described above and the mask reference point described above are calculated. With reference to the longitudinal direction mask table 3461, the alpha adjusting values 92 corresponding to the distances are added to alpha values of the pixels. RGB values of the pixels are adjusted so that the above-mentioned fog color is increased as indicated by the fog color adjusting values 93 of the longitudinal direction mask table. The mask processing at step S33 ends.

Referring back to FIG. 13, after the mask processing at step S33, the color image which is a background and the fog image which is a fore ground are synthesized. The synthesized image is stored as a special effect image in the frame buffer (step S34). Specifically, pixel values R are calculated by using the following equation and the images are synthesized, thereby generating the special effect image, $$R = R1 \times (1.0 - \alpha) + R2 \times \alpha$$

(wherein R1 is RGB of the color image (background), R2 is RGB of the fog image (foreground), α is an alpha value which is set for the fog image, $0 \leq \alpha \leq 1$, and 1=100%). By synthesizing the color image and the fog image in such a manner, boundaries of the masks in the fog image can be blurred. In other words, by adding the fog color in accordance with the Z values or the like, an unnatural image in which the boundaries of the masks in the fog image can be clearly seen can be prevented. Thus, the special effect image in which the color image can be seen around the player object is generated. The special image generation processing at step S5 in FIG. 4 ends.

Referring back to FIG. 4, after the processing at step S5, display processing is performed (step S6). In other words, the special effect image generated at step S5 or the normal image generated at step S10, which have been stored in the frame buffer, is displayed as a game image on the monitor 12. After the processing at step S6, it is determined whether or not the game is finished (step S7). When it is determined that the game is finished (YES at step S7), the game is finished and when it is determined the game is not finished (NO at step S7), returning back to step S2, the game processing is repeated.

As described above, according to the present embodiment, in a world, as in the "twilight world", which is represented by the special effect image, portions near the player object are displayed in a colorful manner and portions distant from the player object are displayed in a non-colorful manner. Thus, representing a world which is a scene where the player object plays an active role by using the special effect image allows the contents of a game to be made colorful. In addition, a position of the player object in the world represented by the special effect image is easily grasped by a player, resulting in a good operability.

Figure 15:
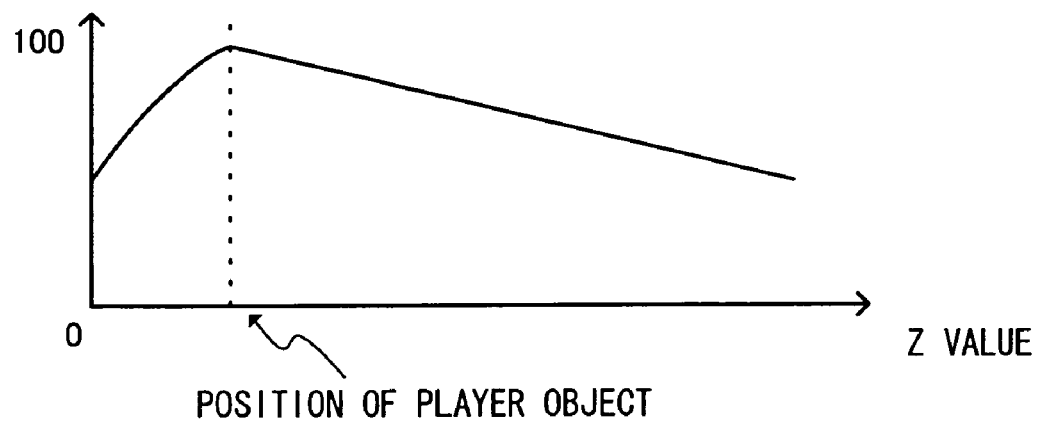
FIG. 15 is a graph showing an example of setting of an alpha value.

In the present embodiment, although the alpha values are set for the fog image, the alpha values may be set for the color image. In other words, the first rendering processing may be performed with the alpha values added and the second rendering processing may be performed with no alpha values added. In this case, as shown in FIG. 15, the alpha value may be set so that the alpha value is largest at a position of the player object (in other words, transparency is low) and the more distant portion of the color image are from the player object, the smaller the alpha values are (in other words, transparency is high).

Figure 16:
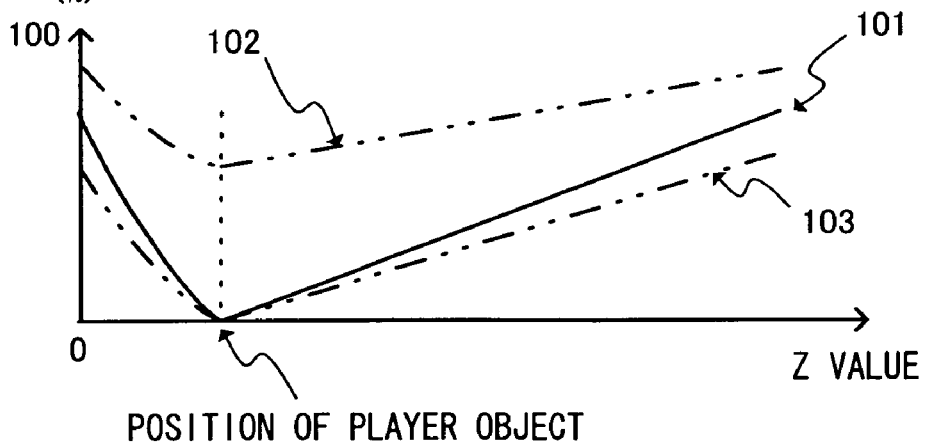
FIG. 16 is a graph showing an example of setting of an alpha value in accordance with a condition or the like of the player object.

As shown in FIG. 16, the alpha value may be adjusted to be large or small in accordance with time of day, a position of the player object, a moving velocity of the player object, a kind of the player object in the virtual game space. Specifically, a predetermined value in accordance with a state of the player object is subtracted from or added to an alpha value which is calculated by using the formula set at step S25 described above (as indicated a graph 101 in FIG. 16), or an alpha value which is calculated by using the formula set at step S25 described above is multiplied by a predetermined value, whereby an image synthesis ratio is adjusted so that the fog image is emphasized (as indicated by a graph 102 in FIG. 16) or the color image is emphasized (as indicated by a graph 103 in FIG. 16). When the alpha value is adjusted as indicated by the graph 102 in FIG. 16, a color contrast between the color image and the fog image is not very sharp between a periphery of the player object and a distant landscape, not resulting in an image in which a color in the periphery of the player object is emphasized. On the other hand, when the alpha value is adjusted as indicated by the graph 103 in FIG. 16, the color contrast between the color image and the fog image is sharp between the periphery of the player object and the distant landscape, resulting in an image in which a color in the periphery of the player object is emphasized and a position of the player object can be easily seen.

For example, if the above-mentioned adjustment is carried out in accordance with time of day, the alpha value is adjusted as indicated by the graph 102 in FIG. 16 when it is night in the virtual game space, thereby resulting in an image in which the fog image is emphasized. On the other hand, the alpha value is adjusted as indicated by the graph 103 in FIG. 16 when it is noon in the virtual game space, thereby resulting in an image in which the color image is emphasized. If the above-mentioned adjustment is carried out in accordance with a place, for example, it is considered that the calculated alpha value is used as it is (i.e., a value indicated by the graph 101 in FIG. 16) and when the player object in the "twilight world" approaches an entrance of the "normal world", the alpha value is adjusted so as to be gradually as indicated by the graph 103 in FIG. 16. If the alpha value is adjusted in accordance with a moving velocity, for example, it is considered that the above-mentioned adjustment is carried out so that the alpha value is as indicated by the graph 102 in FIG. 16 when the moving velocity is high, thereby resulting in an image in which the fog image is emphasized, and so that the alpha value is as indicated by the graph 103 in FIG. 16 when the player object is still, thereby resulting in an image in which the color image is emphasized. When the player object is moving, it is easy for a player to grasp a position of the player object even without using the above-mentioned special effect image. However, when the player object stands still, if the above-mentioned special effect image is not used, it is difficult for a player to find a position of the player object. Therefore, the color of the periphery of the player object is emphasized, allowing a player to easily grasp the position of the player object. If the above-mentioned adjustment is carried out in accordance with a kind of the player object, the following is considered. For example, when the player object is in a state of a human being, the alpha value is adjusted as indicated by the graph 102 in FIG. 16, thereby resulting in an image in which the fog image is emphasized. Thus, the alpha value is adjusted in accordance with a development of a game, a change in natural environment, or the like, thereby providing a game having realistic sensation enhanced.

And instead of the above-mentioned second rendering processing (step S5 in FIG. 4), a depth value which is stored in the Z buffer when the color image is generated may be used. In other words, a predetermined fog color in accordance with a value in the Z buffer may be added to respective pixels of the color image generated in the first rendering processing. FIG. 17 is a flowchart showing detailed special effect image generation processing (performed instead of the processing at step S5 in FIG. 4) in a case where the second rendering processing is not performed. In FIG. 17, a color image is generated through the first rendering processing, as similarly at step S31 described above (step S51). Then a value of a pixel which has undergone the rendering is written in the frame buffer and a Z value (a depth value) of the pixel is written in the Z buffer. Next, in accordance with a difference between the Z value of another pixel and a reference value which is a Z value of a predetermined pixel (for example, a pixel at which the player object is displayed), a fog color is added as indicated by the graph in FIG. 6 (step S52). Mask processing, as similarly at step S33 described above, is performed for the color image to which the fog color has been added (step S53). The color image processed in such a manner is a special effect image. Thus, it is not necessary to perform the rendering processing twice, reducing a processing load. In addition, a boundary of the color of the mask may be blurred by synthesizing, as similarly in the above-mentioned embodiment, the image having the fog color added in such a manner and the color image to which the fog color is not yet added. In this case, needless to say, when the fog color is added in accordance with a value in the Z buffer as described above, an alpha value is set in accordance with a value in the Z buffer.

Furthermore, an order of processing at step S52 and step S53 may be reversed. In other words, the mask processing at step S53 described above is performed for the color image stored in the frame buffer in the first rendering processing. And thereafter, the processing at step S52, i.e., the processing in which the fog color is added in accordance with a Z value, may be performed for the image which has undergone the mask processing.

Although in the above-mentioned embodiment, a single color is used as the fog color, a plurality of fog colors may be used. For example, a fog color added in accordance with a Z value in the processing at step S32 and S52 is white. On the other hand, a fog color added in the mask processing at step S33 and S53 may be grey. Thus, it is possible to take a balance of the fog colors in the depth, upper and lower portions, and right and left portions of the virtual game space, generating a game image having less sense of unnaturalness.

While the example embodiment presented herein has been described in detail, the foregoing description is in all aspects illustrative and not restrictive. It is understood that numerous other modifications and variations can be devised without departing from the scope of the example embodiment.

What is claimed is:

1. A non-transitory storage medium having stored therein a game program which causes a computer in a game apparatus for displaying an image of a virtual game space, which is shot by a virtual camera, to execute:
    image generation for generating the image of the virtual game space, which is shot by the virtual camera;
    first color blending for blending, at a rate which is calculated in accordance with a distance from a predetermined reference position to another position in the virtual game space in a shooting direction of the virtual camera, a first color into a color at the another position in the image generated at the image generation;
    two-dimensional second color blending for blending, at a rate which is calculated in accordance with a distance from a predetermined reference pixel to another pixel in the image into which the first color has been blended at the first color blending, a second color into a color at the another pixel; and
    outputting the image which has been processed at the second color blending.

2. The non-transitory storage medium according to claim 1, having stored therein the game program, wherein the rate of blending the first color into another pixel is decreased in accordance with a decrease in the distance from the reference position to the another position in the shooting direction of the virtual camera in the virtual game space.

3. The non-transitory storage medium according to claim 1, having stored therein the game program, wherein the reference pixel is a pixel corresponding to the reference position.

4. The non-transitory storage medium according to claim 3, having stored therein the game program, wherein the reference position is a position of the player object existing in the virtual game space.

5. The non-transitory storage medium according to claim 1, having stored therein the game program, wherein the rate of blending the second color into the another pixel is decreased in accordance with a decrease in the distance from the reference pixel to the another pixel.

6. A non-transitory storage medium having stored therein a game program which causes a computer in a game apparatus for displaying an image of a virtual game space, which is shot by a virtual camera, to execute:
    image generation for generating the image of the virtual game space, which is shot by the virtual camera;
    two-dimensional first color blending for blending, at a rate which is calculated in accordance with a distance from a predetermined reference pixel to another pixel in the image generated at the image generation, a first color into a color at the another pixel;
    second color blending for blending, at a rate which is calculated in accordance with a distance from a predetermined reference position to another position in the virtual game space in a shooting direction of the virtual camera, a second color into a color at the another position in the image into which the first color has been blended at the first color blending; and
    outputting the image which has been processed at the second color blending, wherein the rate of blending the first color into the another pixel is decreased in accordance with a decrease in the distance from the reference pixel to the another pixel.

7. The non-transitory storage medium according to claim 6, having stored therein the game program, wherein the rate of blending the second color into the pixel is decreased in accordance with a decrease in the distance from the reference position to the another position in the shooting direction of the virtual camera in the virtual game space.

8. The non-transitory storage medium according to claim 6, having stored therein the game program, wherein the reference pixel is a pixel corresponding to the reference position.

9. The non-transitory storage medium according to claim 8, having stored therein the game program, wherein the reference position is a position of the player object existing in the virtual game space.

10. A non-transitory storage medium having stored therein a game program which causes a computer in a game apparatus for storing in a frame buffer a game image obtained through shooting by means of a virtual camera and storing in a Z buffer a depth value of a pixel of the game image, to execute:
    first color blending for blending, at a rate which is calculated in accordance with a difference between a reference value which is a depth value of a predetermined pixel and a depth value of another pixel in the game image, a first color into the another pixel in the game image;
    two-dimensional second color blending for blending, at a rate which is calculated in accordance with a distance from a reference pixel, which is a predetermined pixel, to another pixel in the game image into which the first color has been blended at the first color blending, a second color into the another pixel; and outputting the image which has been processed at the second color blending.

11. The non-transitory storage medium according to claim 10, having stored therein the game program, wherein the rate of blending the first color into the another pixel is decreased in accordance with a decrease in the difference between the reference value and the depth value of the another pixel.

12. The non-transitory storage medium according to claim 10, having stored therein the game program, wherein the reference pixel is a pixel corresponding to the reference value.

13. The non-transitory storage medium according to claim 12, having stored therein the game program, wherein the pixel corresponding to the reference value is a pixel corresponding to a position of the player object existing in the virtual game space.

14. The non-transitory storage medium according to claim 10, having stored therein the game program, wherein the rate of blending the second color into the another pixel is decreased in accordance with a decrease in the distance from the reference pixel to the another pixel.

15. A non-transitory storage medium having stored therein a game program which causes a computer in a game apparatus for storing in a frame buffer a game image obtained through shooting by means of a virtual camera and storing in a Z buffer a depth value of a pixel of the game image, to execute:

two-dimensional first color blending for blending, at a rate which is calculated in accordance with a distance from a reference pixel, which is a predetermined pixel, to another pixel in the game image into which the color has been blended, a first color into the another pixel;

second color blending for blending, at a rate which is calculated in accordance with a difference between a reference value, which is a depth value of a predetermined pixel, and a depth value of another pixel in the game image into which the first color has been blended at the first color blending, a second color into the another pixel in the game image; and outputting the image which has been processed at the second color blending, wherein the rate of blending the first color into the another pixel is decreased in accordance with a decrease in the distance from the reference pixel to the another pixel.

16. The non-transitory storage medium according to claim 15, having stored therein the game program, wherein the rate of blending the second color into the another pixel is decreased in accordance with a decrease in the difference between the reference value and the depth value of the another pixel.

17. The non-transitory storage medium according to claim 15, having stored therein the game program, wherein the reference pixel is a pixel corresponding to the reference value.

18. The non-transitory storage medium according to claim 17, having stored therein the game program, wherein the reference pixel is a pixel corresponding to a position of the player object existing in the virtual game space.

19. A game apparatus for displaying an image of a virtual game space, which is shot by a virtual camera, comprising:

an image generation unit for generating the image of the virtual game space, which is shot by the virtual camera;

a first color blending unit for blending, at a rate which is calculated in accordance with a distance from a predetermined reference position to another position in the virtual game space in a shooting direction of the virtual camera, a first color into a color at the another position in the image generated by the image generation unit;

a two-dimensional second color blending unit for blending, at a rate which is calculated in accordance with a distance from a predetermined reference pixel to another pixel in the image into which the first color has been blended by the first color blending unit, a second color into the color at the another pixel; and an output unit for outputting the image which has been processed by the second color blending unit.

20. A game apparatus for displaying an image of a virtual game space, which is shot by a virtual camera, comprising:

an image generation unit for generating the image of the virtual game space, which is shot by the virtual camera;

a two-dimensional first color blending unit for blending, at a rate which is calculated in accordance with a distance from a predetermined reference pixel to another pixel in the image generated by the image generation unit, a first color into the color at the another pixel;

a second color blending unit for blending, at a rate which is calculated in accordance with a distance from a predetermined reference position to another position in the virtual game space in a shooting direction of the virtual camera, a second color into a color at the another position in the image into which the first color has been blended by the first color blending unit; and an output unit for outputting the image which has been processed by the second color blending unit, wherein the rate of blending the first color into the another pixel is decreased in accordance with a decrease in the distance from the reference pixel to the another pixel.

21. A game apparatus for storing in a frame buffer a game image obtained through shooting by means of a virtual camera and storing in a Z buffer a depth value of a pixel of the game image, comprising:

a first color blending unit for blending, at a rate which is calculated in accordance with a difference between a reference value, which is a depth value of a predetermined pixel, and a depth value of another pixel in the game image, a first color into the another pixel in the game image;

a two-dimensional second color blending unit for blending, at a rate which is calculated in accordance with a distance from a reference pixel which is a predetermined pixel in the game image, into which the first color has been blended by the first color blending unit, to another pixel, a second color into the another pixel; and an output unit for outputting the image which has been processed by the second color blending unit.

22. A game apparatus for storing in a frame buffer a game image obtained through shooting by means of a virtual camera and storing in a Z buffer a depth value of a pixel of the game image, comprising:

a two-dimensional first color blending unit for blending, at a rate which is calculated in accordance with a distance from a reference pixel, which is a predetermined pixel in the game image, to another pixel in the game image into which the color has been blended, a first color into the another pixel;

a second color blending unit for blending, at a rate which is calculated in accordance with a difference between a reference value, which is a depth value of a predetermined pixel, and a depth value of another pixel in the game image into which the first color has been blended by the first color blending unit, a second color into the another pixel in the game image; and an output unit for outputting the image which has been processed by the second color blending unit, wherein the rate of blending the first color into the another pixel is 23. A method for displaying an image of a virtual game space, which is shot by a virtual camera, comprising:
  image generation for generating the image of the virtual game space, which is shot by the virtual camera;
  first color blending for blending, using at least one computer, at a rate which is calculated in accordance with a distance from a predetermined reference position to another position in the virtual game space in a shooting direction of the virtual camera, a first color into a color at the another position in the image generated at the image generation;
  two-dimensional second color blending for blending, using at least one computer, at a rate which is calculated in accordance with a distance from a predetermined reference pixel to another pixel in the image into which the first color has been blended at the first color blending, a second color into a color at the another pixel; and
  outputting the image which has been processed at the second color blending.

24. A method for displaying an image of a virtual game space, which is shot by a virtual camera, comprising:
  image generation for generating the image of the virtual game space, which is shot by the virtual camera;
  two-dimensional first color blending for blending, using at least one computer, at a rate which is calculated in accordance with a distance from a predetermined reference pixel to another pixel in the image generated at the image generation, a first color into a color at the another pixel;
  second color blending for blending, using at least one computer, at a rate which is calculated in accordance with a distance from a predetermined reference position to another position in the virtual game space in a shooting direction of the virtual camera, a second color into a color at the another position in the image into which the first color has been blended at the first color blending; and
  outputting the image which has been processed at the second color blending, wherein
  the rate of blending the first color into the another pixel is decreased in accordance with a decrease in the distance from the reference pixel to the another pixel.

25. A system comprising:
  an image generation unit for generating an image of a virtual game space, which is shot by a virtual camera;
  a first color blending unit for blending, at a rate which is calculated in accordance with a distance from a predetermined reference position to another position in the virtual game space in a shooting direction of the virtual camera, a first color into a color at the another position in the image generated by the image generation unit;
  a two-dimensional second color blending unit for blending, at a rate which is calculated in accordance with a distance from a predetermined reference pixel to another pixel in the image into which the first color has been blended by the first color blending unit, a second color into the color at the another pixel; and
  an output unit for outputting the image which has been processed by the second color blending unit.

26. A system comprising:
  an image generation unit for generating an image of a virtual game space, which is shot by a virtual camera;
  a two-dimensional first color blending for blending, at a rate which is calculated in accordance with a distance from a predetermined reference pixel to another pixel in the image generated by the image generation unit, a first color into the color at the another pixel;
  a second color blending unit for blending, at a rate which is calculated in accordance with a distance from a predetermined reference position to another position in the virtual game space in a shooting direction of the virtual camera, a second color into a color at the another position in the image into which the first color has been blended by the first color blending unit; and
  an output unit for outputting the image which has been processed by the second color blending unit, wherein
  the rate of blending the first color into the another pixel is decreased in accordance with a decrease in the distance from the reference pixel to the another pixel.

* * * * *